United States Patent [19]

Fisher et al.

[11] Patent Number: 5,943,688
[45] Date of Patent: Aug. 24, 1999

[54] AUTOMATED DATABASE BACK-UP WITHIN A DATA STORAGE SYSTEM USING REMOVABLE MEDIA

[75] Inventors: James Arthur Fisher, Tucson; Gregory Tad Kishi, Oro Valley; Jonathan Wayne Peake, Tucson, all of Ariz.

[73] Assignee: International Business Machines Corporation, Armonk, N.Y.

[21] Appl. No.: 08/865,523

[22] Filed: May 29, 1997

[51] Int. Cl.$^6$ .................................................. G06F 12/16
[52] U.S. Cl. ...................................... 711/162; 395/182.17
[58] Field of Search .................................. 711/161, 162; 707/202, 204; 395/182.17

[56] References Cited

U.S. PATENT DOCUMENTS

| | | | |
|---|---|---|---|
| 4,467,421 | 8/1984 | White ........................................ | 711/118 |
| 5,446,884 | 8/1995 | Schwendemann et al. ............ | 707/202 |
| 5,475,834 | 12/1995 | Anglin et al. ............................. | 711/169 |
| 5,604,862 | 2/1997 | Midgely et al. ..................... | 395/182.04 |

OTHER PUBLICATIONS

"Generate Unique and Recoverable Object Identifier", IBM Technical Disclosure Bulletin, Nov., 1989, vol. 32, No. 6B, pp. 112–115.

"Medium Self–Description for Removable Medium Devices", IBM Technical Disclosure Bulletin, Nov., 1994, vol. 37, No. 11, pp. 139–145.

"Restoring Data From DASD Volumes Having Hardware Errors", IBM Technical Disclosure Bulletin, Dec., 1988, vol. 31, No. 7, pp. 313–317.

*Primary Examiner*—Eddie P. Chan
*Assistant Examiner*—Kevin L. Ellis
*Attorney, Agent, or Firm*—Robert M. Sullivan

[57] ABSTRACT

A data storage system provides a method and apparatus for preserving consistency between a database back-up and a set of storage volumes. The system includes a storage manager, or storage controller, interconnected to a plurality of storage volumes, a drive, and a database storage. The storage manager receives data files from an attached data processing unit. The storage manager directs the data files such that the files are written to a selected storage volume loaded into the drive. The storage manager maintains reference information and storage volume location information for each data file in the database storage. The storage manager detects a volume full condition when the storage media approaches a predetermined position prior to the physical end of the volume. The storage manager generates a back-up copy of the current database, transfers the database back-up to the drive, and directs the drive to write the database back-up onto the selected storage volume. Thus, each selected storage volume contains a database back-up which remains consistent with the data files currently stored on the selected storage volume and previously stored on previously selected storage volumes.

31 Claims, 4 Drawing Sheets

AUTOMATED DATABASE BACK-UP WITHIN A DATA STORAGE SYSTEM USING REMOVABLE MEDIA

FIELD OF THE INVENTION

The present invention relates generally to data storage systems that manage sequential data storage media, such as magnetic tape or optical disk. More particularly, the invention concerns backing-up a database, or catalog, within the data storage system. The database, or catalog, contains a list, where each element in the list identifies a storage location within the data storage subsystem for each data file. The invention ensures that the database back-up maintains consistency with a set of storage volumes within the data storage system.

BACKGROUND OF THE INVENTION

Data processing systems typically require a large amount of data storage. Customer data, or data generated by users within the data processing system, occupies a great portion of this data storage. Effective data storage systems often store data on removable media, such as magnetic tape or optical disks, since removable media provides a lower cost per unit of storage.

Removable media is useful for data that must be stored for long periods of time, data that is infrequently accessed, or data that is backed-up or migrated from more accessible storage media, such as electronic memory or direct access storage devices (DASDs).

Data storage systems often utilize separate databases, or catalogs, to maintain reference information, directory information, and storage location information about the customer data files stored within the system. The reference, or directory, information typically includes a customer identifier, a file directory, and/or a file name. The storage location information typically contains a storage volume identifier and a corresponding offset, thereby defining the location of the customer data file within the storage system. In addition, the database, or catalog, can assign an unique identifier to each customer data file, allowing a storage system controller to track the individual files through the data storage system.

The database, or catalog, is critical to accessing the customer data files with the data storage system, as it provides pointers to the corresponding storage location for each file. The database is typically stored separately within the data storage system, in a faster-access storage medium, such as a non-volatile, electronic memory or a DASD. The database can only provide access to the customer data files if the database is consistent with the set of storage volumes within the data storage system. That is, the database accurately reflects the file contents of the storage volumes. During normal processing, the database is updated as each new data file is stored within the storage system. This ensures that the database remains consistent with the attached storage volumes. The database storage, however, is also susceptible to failures or errors, potentially resulting in data loss. Thus, data storage systems require a back-up of the database to minimize the effects of a failure within the database storage. Normally, an operator causes a database back-up to be taken. Some advanced data storage systems periodically create a back-up copy of the database. A storage manager, or storage controller, within the system can then recover the database from the database back-up should such a failure occur to the database storage media.

A back-up copy of the database can potentially introduce new problems to the data storage system. Backing-up the database to a single storage volume, or even a set of storage volumes, may create storage problems within the data storage system. The database back-up storage volume must be identified within the storage system. Placing a record within the database pointing to the database back-up volume does not eliminate this problem, since the database storage media could still suffer a failure resulting in the loss of the reference to the database back-up. Additionally, if the database back-up reference is not lost, the storage volume containing the database back-up could be damaged or destroyed. Damage resulting from water, fire, or some other natural disaster often destroy a subset of the storage volumes within the data storage systems. If the database back-up happens to be one of those volumes destroyed, database recovery, as well as the recovery of customer data, may be impossible.

A periodic back-up of the database also creates problems within the data storage system. When storage locations of customer data files change after a database back-up was completed, the database back-up is no longer consistent with the storage volumes. The database reflects the correct storage location information for the data files within the storage system, but the database back-up reflects outdated storage location information for the files that moved within the storage system since the database back-up was created. Data files added to the storage system create one type of problem for the database back-up. The database back-up lacks a record, or identifier, for the new file within the storage system and a pointer to the storage volume location of the new file.

On the other hand, moved or deleted data files create a more troublesome problem for the database back-up. The database back-up points to the previous location of the moved file within the storage system. If a new file is subsequently overwritten in the previous storage location of the moved file, two problems are created for the database back-up. As stated earlier, the database back-up lacks a record of the new file. If used to recover the database, the database back-up cannot provide the storage manager with a storage location pertaining to the new file. In addition, the database back-up also loses a pointer to the storage location of the moved file. The database back-up includes a reference to the moved file, but instead points to the previous storage location of the moved file, the same location now overwritten by the new file. If used to recover the database, the database back-up would incorrectly provide the storage manager access to the new file instead of the moved file. Since the database back-up contains no information about the destination of the moved file, references to both the new file and the moved file are lost in the database back-up.

For example, files a, b exist on storage volume A in the storage system when a back-up is created for the database. The storage manager then reclaims volume A by copying files a, b to storage volume B. The database is updated to point to volume B for the storage location for files a, b. The data pertaining to files a, b, however, is not erased from volume A when it is reclaimed. Thus, the database back-up still can access files a, b should the database be recovered at this point. The storage manager then copies new files c, d to volume A, overwriting files a, b. Again, the database is updated to point to volume A for the storage location for files c, d. Now, the database back-up incorrectly points to c as a storage location for file a. If the database were to be recovered from the database back-up at this point, files a, b, c, d would be lost.

Accordingly, an improved method and apparatus are needed in a data storage system to maintain consistency between a database back-up and a set of storage volumes. In particular, the improved method and apparatus should ensure that the database back-up is not lost when any of the storage volumes are damaged or destroyed. In addition, the improved method and apparatus should ensure that the database back-up remains consistent with a set of storage volumes within the data storage system. That is, the improved method and apparatus should maintain correct storage location references in the database back-up when customer data files are newly written to or moved within a set of storage volumes.

SUMMARY OF THE INVENTION

An object of the present invention is to provide an improved method in a data storage system to maintain consistency between a database back-up and a set of storage volumes. In particular, the method copies a current version of the database to each storage volume when the volume has been filled with customer data. In a preferred embodiment, the copy of the database, or database back-up, is stored between a logic end and a physical end of the storage volume.

Another object of the present invention is to provide a storage manager, or storage controller, that maintains consistency between a database back-up and a set of attached storage volumes. In particular, the storage manager copies a current version of the database to each storage volume when the volume has been filled with data files. In a preferred embodiment, the storage manager stores the copy of the database, or database back-up, between a logic end and a physical end of the storage volume.

A first embodiment of the present invention includes a method within a data storage system for preserving consistency between a database back-up and a set of storage volumes. The data storage system includes a database, a drive, and a storage manager, and receives data files from an attached data processing unit. The method maintains reference information and storage volume location information in the database for each of the data files received from the data processing unit. The method also stores the data files on a selected storage volume by loading said selected storage volume into the drive and writing the data file onto the selected storage volume. The method further programs the drive to report a logical end of volume at a predetermined position prior to the physical end of said selected storage volume. The method then signals a volume full message when the logical end of volume is reached on the selected storage volume, preventing any subsequent data files from being written to the selected storage volume. The method then copies the entire database onto the selected storage volume between the logical end and the physical end of the selected storage volume, generating a complete database back-up. The method preserves consistency between the database back-up and a set of storage volumes by including the reference information and the storage location information for the data files currently stored on the entire set of storage volumes within the data storage system.

Another embodiment of the present invention includes a data storage system having a storage manager, or storage controller, interconnected to a plurality of storage volumes, one or more drives, and a database storage. The data storage system receives data files from an attached data processing unit. The data files are stored within the storage volumes. The database storage contains reference information and storage volume location information for each of the data files. The drive writes the data files onto a selected storage volume, which has been loaded into the drive. The drive is programmed to report a logical end of volume at a predetermined position prior to the physical end of the selected storage volume. The drive further signals a volume full message when the logical end of volume is reached on the selected storage volume. The storage manager receives the data files from the data processing unit and transfers the data files to the drive. The storage manager receives the volume full message and prevents subsequent data files from being written to the selected storage volume. The storage manager copies the current version of the database to the drive and directs the drive to store the database back-up between the logical end and the physical end of the selected storage volume. Writing the database back-up to the selected storage volume preserves consistency between the database back-up and the storage volumes by including the reference information and the storage location information for the data files currently stored on the entire set of storage volumes within the data storage system.

A still another embodiment of the invention includes an article of manufacture for use in a data storage system. The data storage system includes a storage manager for preserving consistency between a database back-up and a plurality of storage volumes. The article of manufacture comprises a computer-readable storage medium tangibly embodying a program of executable computer instructions. The computer instructions may cause the storage manager to execute the method steps described in the first embodiment of the invention.

The present invention affords its users with a number of distinct advantages. Importantly, the present invention ensures that a database back-up is present even if only a subset of the storage volumes within the data storage system survive a disaster, or other catastrophic event. Each storage volume contains a database back-up that remained consistent with the data files stored on the specific storage volume and those stored on prior-written storage volumes. One who uses the present invention in a data storage system will always have a database to recover, regardless of the number of storage volumes that survive the disaster. In addition, a user of the present invention can force the storage of critical data to removable storage volumes when adequately warned of an imminent disaster, such as a flood or other oncoming natural disaster. In such a situation, a database back-up is automatically appended to each storage volume as it is filled with the critical data. The user then simply needs to secure the removable storage volumes and the critical data and the associated database can be recovered once the disaster has passed.

The foregoing and other objects, features, and advantages of the invention will be apparent from the following more particular description of a preferred embodiment of the invention, as illustrated in the accompanying drawings.

DETAILED DESCRIPTION

Figure 1:
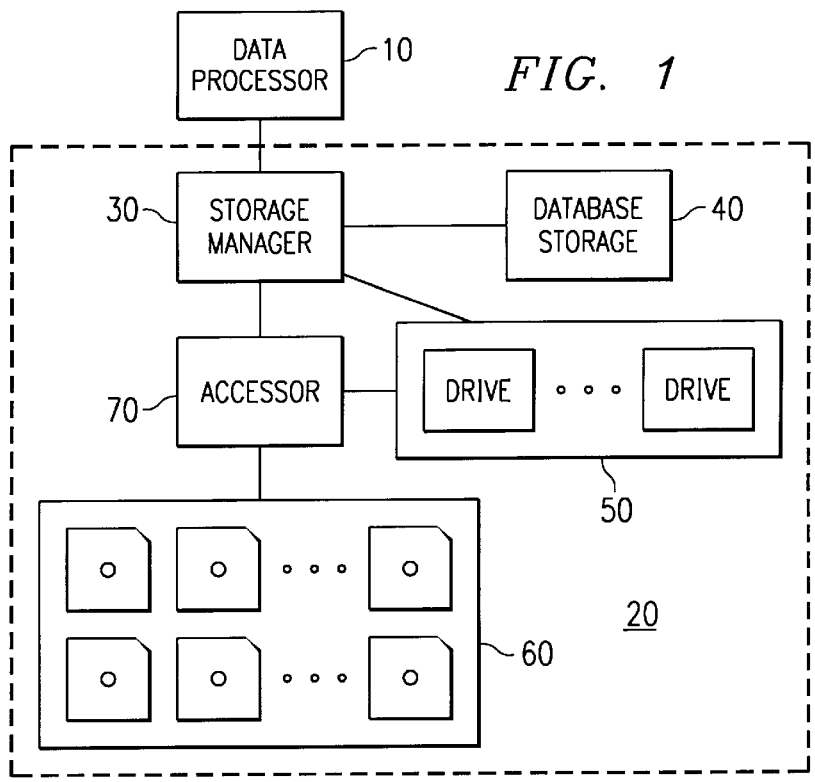
FIG. 1 is a block diagram showing an interconnection of functional components of a data storage system for generating a database back-up in accordance with the present invention.

Referring more particularly to the drawings, like numerals denote like features and structural elements in the various figures. The invention will be described as embodied in a data storage system using a storage manager, or storage controller, to generate a database back-up which preserves consistency between a set of storage volumes and the database back-up. Turning now to FIG. 1, a data storage system 20 is shown coupled to a data processing unit 10. Applications programs running within the data processing unit 10 generate data files to be stored within the data storage system 20. The data processing unit 10 may be embodied by a variety of types and numbers of processing units, such as a mainframe computer, a personal computer, or a workstation. The data storage system 20 includes a set of storage volumes 60, a set of drive units 50, a database storage 40, a storage manager 30 interconnected therein, and, optionally, an accessor 70. The storage manager, or storage controller, 30 is also coupled to the data processing unit 10, and may comprise a digital processing apparatus such as a microprocessor, personal computer, or more advanced processing machine. The storage volumes 60 may consist of various types of sequential storage media, such as optical disk or magnetic tape.

The storage manager 30 receives the data files from the data processing unit 10 and directs the files to be stored within the storage volumes 60. The storage manager 30 directs the accessor 70 to load a selected storage volume 60 into a drive unit 50. The storage volumes 60 may be stored within an automated library. In such a case, the accessor 70 may contain a gripper to hold the storage volume 60 as it is removed from its storage cell within a storage array and transported to the drive unit 50. The storage manager 30 transfers the data file to the drive unit 50, where the data file is written to the selected storage volume 60 loaded within the drive unit 50. The storage manager 30 maintains reference information and storage volume location information for each data file stored within the data storage system 20 in a database, or catalog. The database is stored within a database storage 40. The database storage 40 is separated from the storage volumes 60, and typically comprises a direct access storage device (DASD) or a non-volatile electronic memory.

Figure 2:
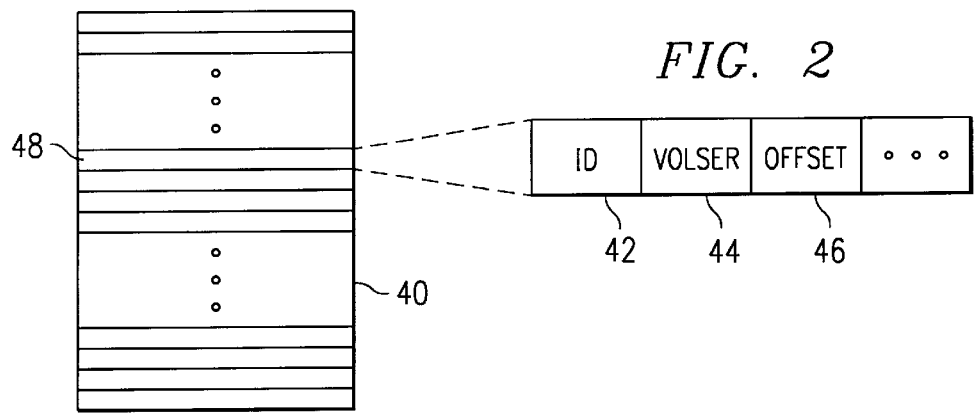
FIG. 2 is a block diagram showing a database storage as depicted in the data storage system of FIG. 1, in accordance with the present invention.

FIG. 2 shows a block diagram representing the database, or catalog, within the database storage 40. The database 40 contains an entry for each data file received from the data processing unit 10 and written to a storage volume 60 within the data storage system 20. FIG. 2 also shows an exploded view of an exemplary entry 48 into the database 40. The entry includes a data file identifier 42, a storage volume identifier 44, and a storage volume offset 46. The data file identifier 42 identifies a particular data file received from the data processing unit 10 at a specific time. The storage volume identifier 44 specifies the storage volume 60 where the data file was written. This identifier 44 is typically a storage volume serial number, or a storage volume label, which uniquely identifies the selected storage volume 60 from the remaining storage volumes 60. The storage volume offset 46 indicates a position within the sequential media of the storage volume where the data file is stored. An offset onto the storage volume 60 is necessary, since volume stacking now allows multiple logical volumes, including multiple data files, to be stored on a single physical storage volume 60. The combination of the storage volume identifier 44 and the storage volume offset 46 effectively provide a pointer to the data file within the data storage system 20. Accordingly, the database storage 40 can be a fraction of the size of the total storage contained within the set of storage volumes 60, since a pointer to the data file occupies a very small fraction of the storage needed for the actual data file.

Figure 3:
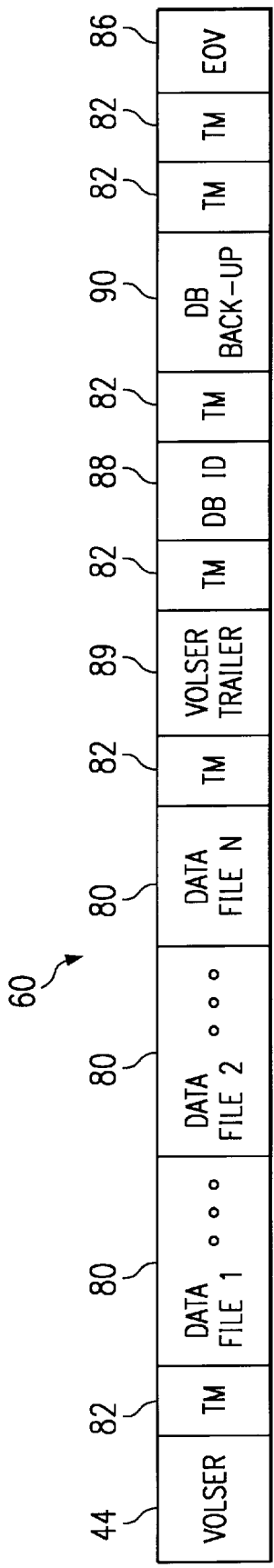
FIG. 3 is a block diagram representing data storage along a sequential media of a storage volume as depicted in FIG. 1, in accordance with the present invention.

FIG. 3 shows a block diagram illustrating an exemplary pattern for writing data files 80 along tape media. Tape media provides an example of a type removable media which could be used as storage volumes 60 within the data storage system 20. A storage volume identifier 44 is typically written at the header of the storage volume 60. As previously described, the storage volume identifier uniquely specifies the storage volume 60 from the remaining storage volumes 60 within the data storage system 20. A tape mark 82 is typically written before and after the data files 80 along the tape media of the storage volume 60. Tape marks 82 may also be optionally written in between the data files 80 along the tape media. Data files 80 written in a close pack format, however, are stacked along the tape media without using tape marks 82 as file separators. As previously described, the storage manager 30 transfers the data files 80 received from the data processing unit 10 to the drive unit 50 so that the data files 80 may be written on the selected storage volume 60. The storage manager 30 also adds an entry 48, or updates an existing entry 48, to the database 40 as each file is successfully written to the selected storage volume 60.

The drive unit 50 is programmed to detect a logical end of volume 84 at a predetermined position before the physical end of the storage volume 86. The drive 50 signals the storage manager 30 that the selected storage volume 60 is full when the logical end of volume 84 is reached. The storage manager 30 communicates with the drive 50 to ensure that a data file 80 does not overwrite the logical end of volume 84. Alternatively, the storage manager 30 may determine when the storage volume is full by monitoring the number of data bytes written in each data file 80 and calculating the remaining space on the storage volume 60. In this case, the storage manager 30 would stop writing data files 80 when only enough space remains on the storage volume 60 to store a database back-up 90.

The storage manager 30 ultimately makes a back-up copy 90 of the current contents of the database 40 when it determines that the storage volume 60 is full, either by receiving the volume full signal from the drive 50 or by calculating the remaining space. The database back-up includes the current entries 48 pointing to the location of each data file 80 within the data storage system 20. The storage manager 30 assigns a database back-up identifier 88 to the database back-up 90 and transfers the database back-up 90 to the drive 50. A tape mark 82 and an optional storage volume trailer 89 followed by an additional tape mark 82 are written to the tape media after the data files 80. The storage manager 30 then directs the drive 50 to write the database back-up identifier 88, a tape mark 82, and the database back-up 90 onto the selected storage volume 60, between the logical end of volume 84 and the physical end of the selected storage volume 86. Thus, the database back-up 90 includes storage volume location information 44, 46 for each data file previously stored within the data storage system, and remains consistent with the selected storage volume 60 and the previously selected storage volumes 60.

Figure 4:
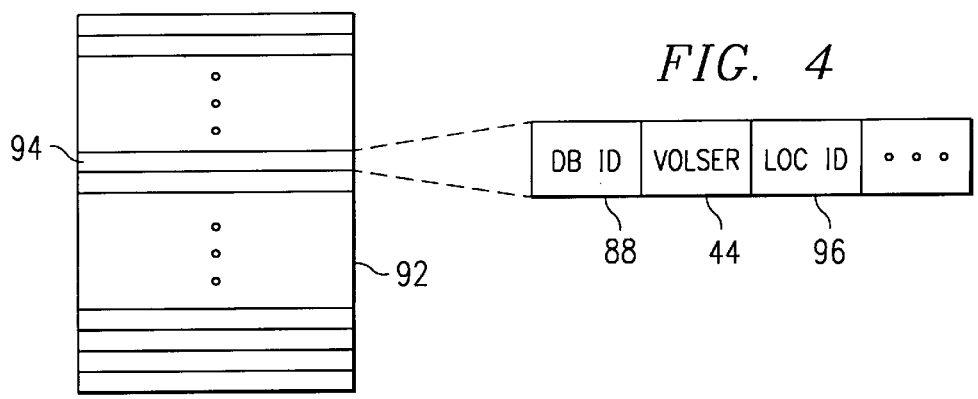
FIG. 4 is a block diagram representing a database back-up list containing entries identifying where back-up copies of the database are stored within the storage volumes, in accordance with the present invention.

Referring to FIG. 4, a block diagram is shown representing a list 92 of pointers to the current database back-up 90 and a predetermined number of previous database back-ups 90. The database back-up list 92 contains an entry 94 for each of the predetermined number of database back-ups 90. FIG. 4 also shows an exploded view of an exemplary entry 94 for a database back-up 90. The entry 94 includes a database back-up identifier 88, a storage volume identifier 44, and optional storage volume location statistics 96. The database back-up identifier 88 specifies a particular database back-up 90, and typically includes a date and time stamp recording when the database back-up 90 was completed. As described earlier, the storage volume identifier 44 uniquely identifies a particular storage volume 60 from the remaining storage volumes 60 within the data storage system 20. The storage volume location statistics 96 typically includes an offset, or pointer, to where the database back-up 90 is located within the storage volume 60, and may also include information about where the storage volume 60 is located in a storage array, if an automated library is used. The storage manager 30 queries the entries 94 in the database back-up list 92 to determine the most recent database back-up 90 when the database 40 needs to be restored. Thus, the database back-up list 92 provides an efficient mechanism for determining a "best" database back-up 90 to be used to restore a corrupted, or unavailable, database 40. In addition, the database back-up list 92 can be used to restore the database 40 to a specific point in time using a database back-up 90 saved at the specific date and time.

Figure 5A:
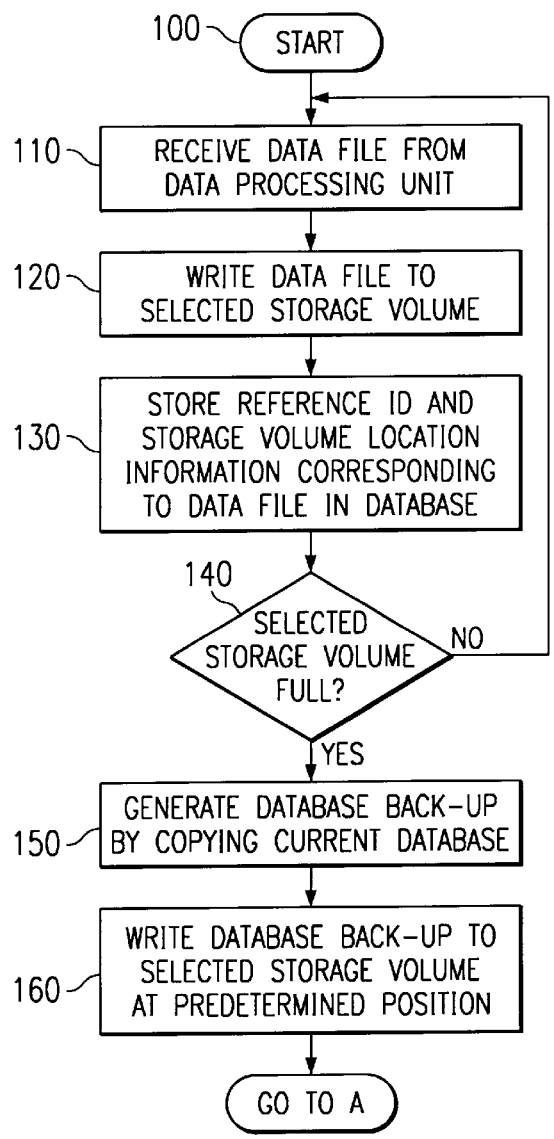
FIGS. 5A and 5B show a flow diagram depicting an illustrative sequence of operational steps used to generate a database back-up according to the present invention.
Figure 5B:
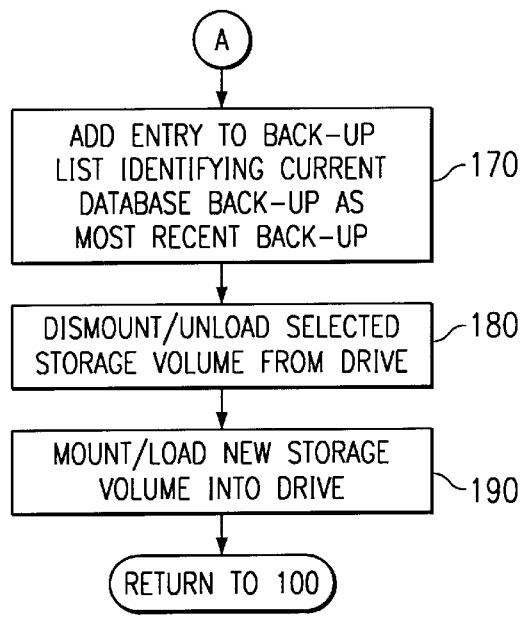

FIGS. 5A and 5B describe a method 100, within the data storage system 20, for generating a database back-up 90, such that the database back-up 90 remains consistent with the set of storage volumes 60. A step 110 receives a data file 80 from the data processing unit 10. As previously stated, application programs running within the data processing unit 10 generate data files 80 to be stored within the data storage system 20. A step 120 writes the data file 80 to a selected storage volume 60. Typically, the storage manager 30 selects a storage volume 60 from the set of storage volumes, and directs an accessor 70 to load the selected storage volume 60 into a drive unit 50. The storage manager 30 then transfers the data file 80 to the drive unit 50, where the data file 80 is written on the sequential media of the storage volume 60. A step 130 stores reference information 42 and storage volume location information 44, 46 pertaining to the current data file 80 in the database 40. The storage manager 30 typically adds an entry 48, or updates an existing entry 48, to the database 40 for the current data file 80 when the data file 80 has been successfully written to the selected storage volume 60. The database entry 48 provides a pointer 44, 46 to the current data file 80 within the set of storage volumes. As previously stated, the storage manager 30 typically maintains the database 40, adding database entries 48 as data files 80 are stored within the data storage system 20 and deleting entries 48 as the corresponding data files 80 are removed from the data storage system 20.

A step 140 determines whether the selected storage volume 60 is full, or whether a next data file 80 received from the data processing unit 10 can be stored on the selected storage volume 60. As described earlier, the storage manager 30 can detect a volume full condition by either calculating the remaining space on the storage volume 60 and determining when the remaining space equals the size of the database back-up 90, or receiving a volume full signal from the drive unit 50. The drive 50 is programmed to detect the logical end of volume 84 at a predetermined position from the physical end of the storage volume 60. If the volume 60 is not full, the next data file 80 can be written to the selected storage volume 60 and the method 100 returns to step 110. Otherwise if the storage volume is full, a step 150 generates a back-up copy 90 of the current database 40. The storage manager 30 typically creates the database back-up 90 by copying the current database entries 48, which contain pointers 44, 46 to each data file 80 currently stored within the data storage system 20. At step 160, the storage manager 30 transfers the database back-up 90 to the drive unit 50, and directs the database back-up 90 to be written at the end of the selected storage volume 60. An optional storage volume trailer 89 may be written prior to the database back-up identifier 88 and the database back-up 90. Thus, the current database back-up 90 remains consistent with any set of storage volumes previously written in the data storage system, since the database back-up 90 contains storage volume location information 44, 46 for the data files currently written on the selected storage volume 60 and previously written on previously selected storage volumes 60.

In FIG. 5B, a step 170 adds an entry 94 to a database back-up list 92 identifying the current database back-up 90 stored onto the selected storage volume 60 as a most recent database back-up. As previously described, the database back-up list 92 contains a list of entries 94 for a previous predetermined number of database back-ups 90. Each entry 94 uniquely identifies a database back-up 88 and specifies the storage volume location 44, 96 where the database back-up 90 is stored in the data storage system 20. The storage manager 30 typically maintains the database back-up list 92, adding entries 94 when a most recent database back-up is successfully stored on the selected storage volume 60 and removing entries 94 representing the least recent, or "oldest" database back-up 90. It should be noted that removing an oldest database back-up entry 94 from the database back-up list 92 does not remove the database back-up from the data storage system 20. The database back-up 90 still resides on the corresponding storage volume 60 and it could be accessed by loading the storage volume 60 into a drive unit 50, scanning the storage volume until the database back-up 90 is detected, and reading the database back-up 90 from the storage volume 60.

A step 180 unloads the selected storage volume 60 from the drive 50 after the database back-up 90 has been successfully written to the volume 60. The storage manager 30 typically directs the drive 50 to dismount the storage volume 60 and then directs the accessor 70 to remove the storage volume 60 from the drive 50 and transport it to a storage cell within a storage array. A step 190 loads a next storage volume 60 into the drive 50 allowing subsequent data files 80 received from the data processing unit 10 to be stored within the data storage system 20. Typically, the storage manager 30 selects a next storage volume 60, directs the accessor 70 to transport the next volume to the drive 50, and directs the drive 50 to mount the next storage volume. Once the next volume is mounted, the method 100 returns to step 110 to continue storing subsequent data files 80 in the data storage system 20.

Figure 6:
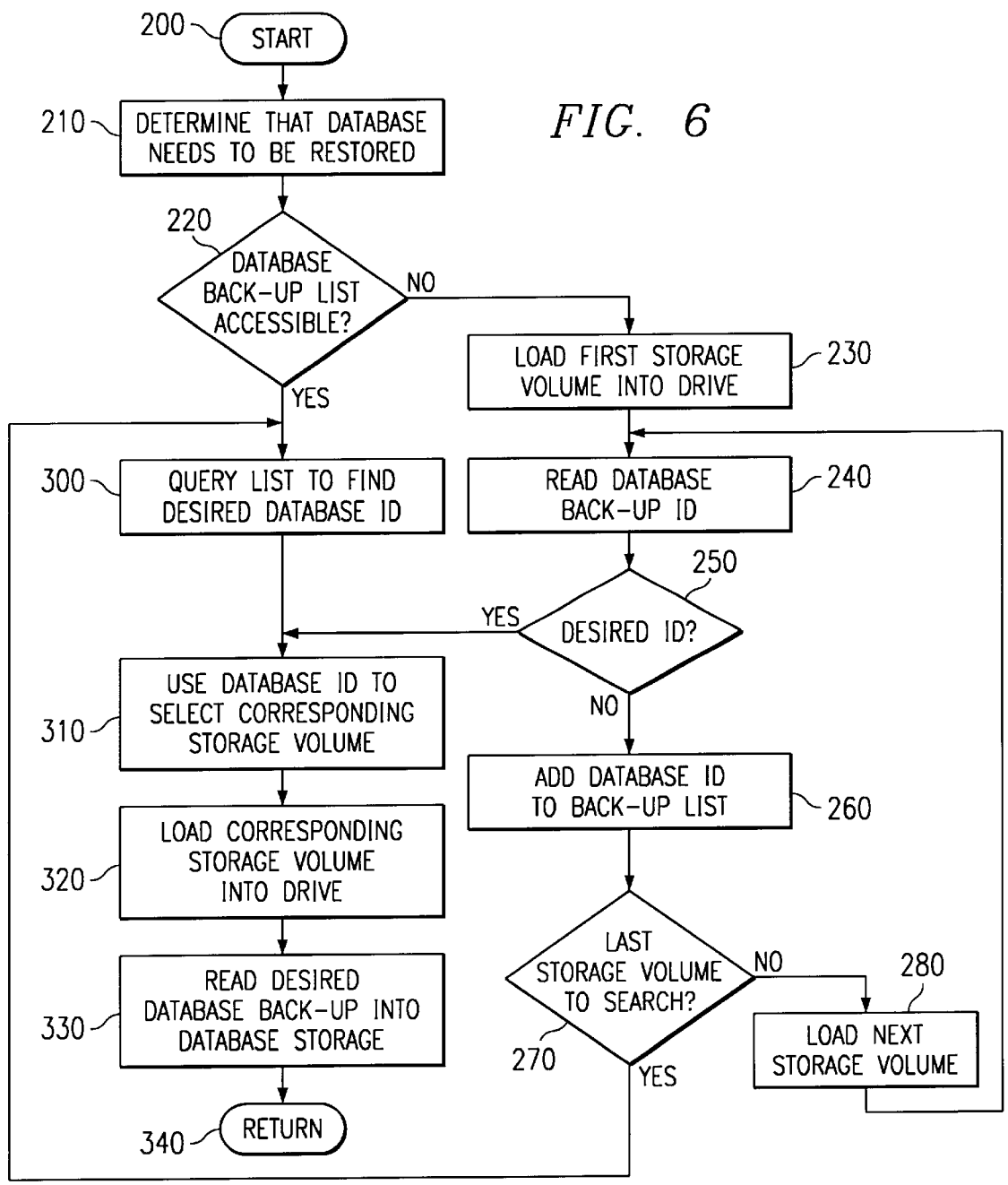
FIG. 6 shows a flow diagram depicting an illustrative sequence of operational steps used to restore a database from a database back-up in accordance with the present invention.

Referring to FIG. 6, a method 200 is shown to restore the database 40 using a desired database back-up 90. As described earlier, a desired database back-up 90 can be measured in various ways, such as a most recent database back-up or database back-up completed at a specific date and time. A step 210 first determines that the database 40 needs to be restored. A step 220 then determines whether the database back-up list 92 is accessible. If so, a step 300 queries the database back-up list 92 to find the most recent database back-up identifier 88. The database back-up identifier 88 includes a date and time stamp. Thus, the storage manager 30 can simply compare the time stamps of each database back-up identifier 88 within the database back-up list to determine the most recent database back-up 90. The storage volume location information 44, 96 associated with the most recent database back-up identifier 88 points to the most recent database back-up 90. Otherwise if the database back-up list 92 is not available, the method continues to find the desired database back-up at step 230 by searching the storage volumes 60 and building a back-up list 92.

A step 230 loads a first storage volume into the drive 50. As before, the storage manager 30 typically directs the accessor 70 to remove the storage volume 60 from its storage cell and transport it to the drive 50. If an accessor 70 is not available in the data storage system 20, the storage manager 30 can display a message on an operator panel directing an operator to manually load the storage volume 60 into the drive 50. A step 240 reads the database identifier 88 from the storage volume 60. As stated earlier, the database identifier 88 includes a date and time stamp indicating how recently the database back-up 90 was generated. A step 250 compares the current database identifier 88 to determine if it is the desired database identifier. If so, the desired database back-up 90 has been found (most likely a database back-up taken at a specific time) and the method continues to step 310. If not, (either the specific date and time database back-up has not been found or all the storage volumes need to be searched to find a most recent database back-up) a step 260 adds the current database identifier 88 and its corresponding storage volume location information 44, 96 to the back-up list 92.

A step 270 determines whether additional storage volumes 60 remain to be searched for a corresponding database back-up 90. If additional storage volumes 60 remain to be searched, step 280 selects a next storage volume and loads it into the drive 50. The method then returns to step 240 to read the corresponding database back-up identifier 88 from the next storage volume 60. Otherwise if the no additional storage volumes 60 remain to be searched, the back-up list has been rebuilt and the method continues at step 300 to search the back-up list to locate the desired database back-up (most likely a most recent database back-up).

A step 310 uses the desired database back-up identifier 88 and the corresponding storage volume location information 44, 96 to select the storage volume 60 corresponding to the desired database back-up 90. A step 320 then loads the selected storage volume 60 into the drive 50. A step 330 locates and reads the desired database back-up 90 within the selected storage volume 60. The storage manager 30 recovers the database 40 by transferring the database back-up 90 from the selected storage volume 60 loaded in the drive 50 to the database storage 40. A restored database 40 provides storage volume location information 44, 46 for the remaining data files 80 within the data storage system 20. A step 340 returns from the method 200 to restore the database 40 from the desired database back-up 90.

Figure 7:
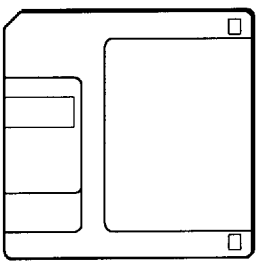
FIG. 7 shows an exemplary article of manufacture according to the present invention.

FIG. 7 depicts a storage medium 400 for storing executable computer instructions, such as a magnetic diskette, an optical disk cartridge, or a magnetic tape cartridge. This figure also represents memories used to store executable computer instructions, such as read-only memory (ROM) or programmable memory (PROM). The requirement for these storage mediums or memories is that they store digital representations of computer executable instructions.

Using the foregoing specification, the invention may be implemented as a machine, process, or article of manufacture by using standard programming or engineering techniques to produce computer software, firmware, hardware, or a combination thereof. Any resulting programs may be embodied within one or more computer usable media such as memory devices or transmitting devices, thereby making a computer program product or article of manufacture according to the invention. As such, the terms "article of manufacture" and "computer program product" as used in the following claims are intended to encompass a computer program existing on any memory device or in any transmitting device. Memory devices include fixed (hard) disk drives, diskettes, optical disks, magnetic tape, and semiconductor memories such as ROM, PROM, etc. Transmitting devices include the internet, electronic bulletin board and message/note exchanges, telephone/modem-based network communication, hard-wired/cable communication network, cellular communication, radio wave communication, satellite communication, and other stationary or mobile network systems and communication links. A computer program product as described above may be used by transmitting it via any of the foregoing transmitting devices.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

While the invention has been particularly shown and described with reference to preferred embodiments thereof, it will be understood by those skilled in the art that various changes in form and details may be made therein without departing from the spirit and scope of the invention. For example, an accessor can mean an automated, robotic gripper for holding and transporting removable media cartridges, or a human operator informed of which cartridge to select from an operator panel. In addition, the database recovery process described in FIG. 6 could build an ordered list of database back-up identifiers, such that a "next most recent" database back-up could be used if the restoration of the database from a most recent database back-up failed. Also, the database identifier can be considered optional, in that the database itself could be parsed to obtain the date-time stamp. Alternatively, the database identifier could contain additional information about the type of database that has been backed-up. In such case, the database identifier could provide information about transitions between different levels of database back-ups, or specifications about the system required to restore the database. Finally, the database back-up could be written to any reserved location on the storage volume, once the storage media is filled. The storage volume could reserve a separate partition, or specific sectors, for storing the database back-up.

What is claimed is:

1. A method in a data storage system for preserving consistency between a database back-up and a plurality of storage volumes, said data storage system receiving data files from a data processing unit, said data storage system including a database, a drive, and a storage manager, said method comprising steps of:

(a) maintaining reference information and storage volume location information in said database for each of said data files received from said data processing unit, said database stored in a database storage separate from said plurality of storage volumes;

(b) storing said data files on a selected storage volume by loading said selected storage volume into said drive and writing said data files onto said selected storage volume;

(c) detecting a volume full condition in said selected storage volume at a predetermined position prior to a physical end of said selected storage volume, said volume full condition preventing subsequent data files from being written to said selected storage volume; and (d) storing a back-up copy of said database starting at said predetermined position prior to said physical end of said selected storage volume, said database back-up providing a duplicate of said database and including said reference information and said storage volume location information for said data files stored on said selected storage volume and previously stored on previously selected storage volumes.

2. The method in claim 1 wherein the step (c) further comprises said drive signalling said volume full condition when said selected storage volume reaches a logical end of volume position, said drive programmed to report said logical end of volume at said predetermined position prior to said physical end of said selected storage volume.

3. The method in claim 1 wherein the step (c) further comprises said storage manager detecting said volume full condition by calculating a remaining space on said selected storage volume and determining when said remaining space is equivalent to a size of said database back-up.

4. The method in claim 1 wherein the step (d) further comprises appending a database back-up identifier to said database back-up stored on said selected storage volume, said database back-up identifier including a volume label corresponding to said selected storage volume and a date and time stamp indicating when said database back-up was completed.

5. The method in claim 4 further comprising:
(e) adding said database back-up identifier to a back-up list containing a plurality of database back-up identifiers, each database back-up identifier corresponding to a previous database back-up stored on a previously selected storage volume.

6. The method in claim 5 further comprising:
(f) unloading said selected storage volume from said drive and returning said selected storage volume to a storage cell within a storage array; and
(g) selecting a next storage volume from said storage array and loading said next storage volume in said drive.

7. The method in claim 6 further comprising:
(h) restoring said database from a desired database back-up by loading a desired storage volume into said drive and reading said desired database back-up into said database storage.

8. The method in claim 7 wherein said restoring step (h) includes querying said back-up list to find a desired database back-up identifier, said desired database back-up identifier indicating said desired storage volume containing said desired database back-up.

9. The method in claim 7 wherein said restoring step (h) includes searching a set of storage volumes to find a desired database back-up identifier, said desired database back-up identifier indicating said desired storage volume containing said desired database back-up.

10. The method in claim 7 wherein said desired database back-up is a most recent database back-up.

11. The method in claim 7 wherein said desired database back-up is a database back-up taken at a specific date and time.

12. The method in claim 7 wherein an accessor loads said selected storage volume into said drive, said accessor having a gripper to remove said storage volume from a storage cell within a storage array and hold said selected storage volume while transporting said selected storage volume to said drive.

13. A data storage system receiving data files from a data processing unit, said data storage system comprising:

a plurality of storage volumes for storing said data files;

a drive for writing said data files onto a selected storage volume, said selected storage volume loaded into said drive, said drive detecting a volume full condition in said selected storage volume at a predetermined position from a physical end of said selected storage volume;

a database storage for maintaining reference information and storage volume location information for each of said data files, said database storage separated from said plurality of storage volumes; and a storage manager interconnected to said data processing unit, said database storage, said drive, and said plurality of storage volumes, said storage manager receiving said data files from said data processing unit and transferring said data files to said drive, said storage manager preventing subsequent data files from being written to said selected storage volume when said volume full condition is detected, said storage manager generating a back-up copy of said database and transferring said database back-up to said drive for writing said database back-up starting at said predetermined position prior to said physical end of said selected storage volume, said database back-up preserving consistency between said database back-up and said plurality of storage volumes by including said reference information and said storage volume location information for said data files currently stored on said plurality of storage volumes.

14. The data storage system in claim 13 wherein said drive reports a logical end of volume at said predetermined position prior to said physical end of said selected storage volume, said drive further signalling said volume full condition to said storage manager when said selected storage volume reaches said logical end of volume position.

15. The data storage system in claim 13 wherein said storage manager detects said volume full condition by calculating a remaining space on said selected storage volume and determines when said remaining space is equivalent to a size of said database back-up.

16. The data storage system in claim 13 further comprising:
an accessor for transporting said selected storage volume between said drive and a storage cell within a storage array, said accessor coupled to and directed by said storage manager to load and unload said selected storage volume into said drive, said accessor having a gripper to hold said storage volume during transport between said storage cell and said drive.

17. The data storage system in claim 13 wherein said storage volumes are magnetic tape cartridges.

18. The data storage system in claim 13 wherein said storage volumes are optical disk cartridges.

19. The data storage system in claim 13 wherein said database storage is a direct access storage device (DASD).

20. The data storage system in claim 13 wherein said database storage is a non-volatile electronic memory.

21. The data storage system in claim 13 further comprising:
   a database back-up identifier appended to said database back-up by said storage manager when storing said database back-up on said selected storage volume, said database back-up identifier including a volume label corresponding to said selected storage volume and a date and time stamp indicating when said database back-up was completed.

22. The data storage system in claim 21 further comprising:
   a back-up list containing a plurality of database back-up identifiers, each database back-up identifier added to said back-up list by said storage manager and corresponding to each database back-up stored on each storage volume.

23. The data storage system in claim 22 wherein said storage manager queries said back-up list to find a desired database back-up identifier, said desired database back-up identifier indicating a desired storage volume containing a desired database back-up, said storage manager restoring said database from said desired database back-up by directing said accessor to load said desired storage volume into said drive and reading said desired database back-up into said database storage.

24. The data storage system in claim 23 wherein said desired database back-up is a most recent database back-up.

25. The data storage system in claim 23 wherein said desired database back-up is a database back-up taken at a specific date and time.

26. The data storage system in claim 25 wherein said storage manager searches a set of storage volumes to find said desired database back-up identifier and said desired database back-up.

27. An article of manufacture for use in a data storage system, said data storage system including a storage manager for preserving consistency between a database back-up and a plurality of storage volumes,
   said article of manufacture comprising a computer-readable storage medium tangibly embodying a program of executable computer instructions which may cause said storage manager to:
      (a) maintain reference information and storage volume location information in a database for each data file received from a data processing unit, said database stored in a database storage separate from said plurality of storage volumes;
      (b) transfer said data files to a drive for storing on a selected storage volume loaded into said drive;
      (c) detect a volume full condition in said selected storage volume at a predetermined position prior to a physical end of said selected storage volume, said volume full condition preventing subsequent data files from being written to said selected storage volume; and
      (d) generate a back-up copy of said database and store said database back-up starting at said predetermined position prior to said physical end of said selected storage volume, said database back-up maintaining consistency between said database back-up and said plurality of storage volumes by including said reference information and said storage volume location information for said data files currently stored on said plurality of storage volumes.

28. The article of manufacture in claim 27 wherein said program of executable computer instructions may further cause said storage manager to:
      (e) append a database back-up identifier to said database back-up stored on said selected storage volume, said database back-up identifier including a volume label corresponding to said selected storage volume and a date and time stamp indicating when said database back-up was completed; and
      (f) add said database back-up identifier to a back-up list containing a plurality of database back-up identifiers, each database back-up identifier corresponding to a previous database back-up stored on a previously selected storage volume.

29. The article of manufacture in claim 27 wherein said program of executable computer instructions may further cause said storage manager to:
      (g) direct an accessor coupled to said storage manager to unload said selected storage volume from said drive and return said selected storage volume to a storage cell within a storage array; and
      (h) select a next storage volume from said storage array and direct said accessor to load said next storage volume in said drive.

30. The article of manufacture in claim 29 wherein said program of executable computer instructions may further cause said storage manager to:
      (i) restore said database from a most recent database back-up by:
         (1) querying said back-up list to find a most recent database back-up identifier, said most recent database back-up identifier indicating a most recent storage volume containing said most recent database back-up, and
         (2) loading said most recent storage volume into said drive and reading said most recent database back-up into said database storage.

31. The article of manufacture in claim 29 wherein said program of executable computer instructions may further cause said storage manager to:
      (j) restore said database from a most recent database back-up by:
         (1) searching a set of storage volumes to find most recent database back-up identifier, said most recent database back-up identifier indicating a most recent storage volume containing said most recent database back-up, and
         (2) loading said most recent storage volume into said drive and reading said most recent database back-up into said database storage.

\* \* \* \* \*